US008078636B2

(12) United States Patent
Layden et al.

(10) Patent No.: US 8,078,636 B2
(45) Date of Patent: *Dec. 13, 2011

(54) DATABASE HEAP MANAGEMENT SYSTEM WITH VARIABLE PAGE SIZE AND FIXED INSTRUCTION SET ADDRESS RESOLUTION

(75) Inventors: David J. Layden, Indianapolis, IN (US); Jeff Beltz, Indianapolis, IN (US); David DeKeyser, Indianapolis, IN (US)

(73) Assignee: Temporal Dynamics, Inc., Fishers, IN (US)

( * ) Notice: Subject to any disclaimer, the term of this patent is extended or adjusted under 35 U.S.C. 154(b) by 1450 days.

This patent is subject to a terminal disclaimer.

(21) Appl. No.: 11/209,551

(22) Filed: Aug. 24, 2005

(65) Prior Publication Data

US 2009/0125478 A1    May 14, 2009

(51) Int. Cl.
*G06F 7/00* (2006.01)
*G06F 17/30* (2006.01)
(52) U.S. Cl. ......... 707/791; 707/802; 707/822; 707/828
(58) Field of Classification Search .................. None
See application file for complete search history.

(56) References Cited

U.S. PATENT DOCUMENTS

| | | | | |
|---|---|---|---|---|
| 5,560,006 A * | 9/1996 | Layden et al. | ......... | 707/999.002 |
| 5,561,778 A * | 10/1996 | Fecteau et al. | ......... | 707/999.205 |
| 5,802,605 A * | 9/1998 | Alpert et al. | .................. | 711/208 |
| 5,809,554 A * | 9/1998 | Benayon et al. | .............. | 711/171 |
| 5,999,933 A * | 12/1999 | Mehta | ........................ | 707/999.1 |
| 6,085,296 A * | 7/2000 | Karkhanis et al. | ............ | 711/206 |
| 6,178,519 B1 * | 1/2001 | Tucker | ............................ | 714/4.4 |
| 6,418,438 B1 * | 7/2002 | Campbell | ...................... | 711/200 |
| 6,477,612 B1 * | 11/2002 | Wang | .............................. | 711/206 |
| 6,499,094 B1 * | 12/2002 | Fraser et al. | ................... | 711/171 |
| 6,654,761 B2 * | 11/2003 | Tenev et al. | ............ | 707/999.003 |
| 6,781,898 B2 * | 8/2004 | Kim et al. | ....................... | 365/200 |
| 2002/0055941 A1 * | 5/2002 | Kolodner et al. | ............. | 707/200 |
| 2002/0144073 A1 * | 10/2002 | Trainin et al. | ................. | 711/170 |

OTHER PUBLICATIONS

Bell, Rob; "A Beginners' Guide to Big O Notation"; 2010.*

* cited by examiner

*Primary Examiner* — Tim T Vo
*Assistant Examiner* — Garrett Smith
(74) *Attorney, Agent, or Firm* — Overhauser Law Offices, LLC

(57) ABSTRACT

A heap management system for a database uses "sets" of pages to store database information. As memory for each successive set of pages is allocated, more memory is allocated for storing rows in each page of the set. Similarly, the maximum number of rows of information storable in each page of each set is greater for each successive set of pages. The number of computer instructions needed to resolve (or calculate) the memory address for a particular row is fixed. Given a target row number, (and the number of rows in the first page, and the width of the column or column group), only a fixed number of computer instructions need to be executed to resolve the starting memory address for the target row. In addition, information of the same type (i.e., one or more columns of a table) may be stored in different pages, and these pages may be located in discontiguous memory segments. This allows space for new rows to be allocated, without requiring all pre-existing rows to be moved to a different memory segment.

10 Claims, 1 Drawing Sheet

DATABASE HEAP MANAGEMENT SYSTEM WITH VARIABLE PAGE SIZE AND FIXED INSTRUCTION SET ADDRESS RESOLUTION

FIELD OF THE INVENTION

The present invention relates to database management systems, and in particular, to heap management systems that store database information in pages.

BACKGROUND

This invention relates database for software applications which are large, complex, or which require dynamic modification and high availability. The invention addresses the stringent requirements of time-critical real-time and other high performance systems. These systems are characterized by their primary need for query performance as opposed to query flexibility. For example, a telecommunications call processing system might need to process 500 calls per second during peak demand periods. If the underlying DBMS can complete a call in 3 milliseconds (just slightly longer than the average 2-millisecond call separation), the system degradation is progressive, and the system will completely collapse. After 10 minutes of peak demand, the call completion delay would be greater than 1 minute. Even if average DBMS performance averages better than 2 ms, any significant variation can result in periods of degraded performance unacceptable in the telecommunications industry. As a result the predictability of the performance is of equal concern.

Database information may be stored in computer memory (i.e., solid state memory directly addressable by a CPU using a physical address) or on hard drives. Computer memory tends to be very fast, but there are practical and cost limitations to how much computer memory can be directly referenced by a CPU. Hard drives can store larger quantities of information, but it takes more time to move information between a CPU and a hard drive. This time constraint for information stored on hard drives makes hard drive storage unsuitable for databases that require extremely fast retrieval or storage of information. Moreover, even when an entire database is stored in computer memory, it is often important that the computer memory be located in one contiguous block, including having freespace available within the allocated block for new rows of information. This is because when there is not sufficient contiguous memory available for a new information, an entirely new, contiguous block of memory must be allocated from the operating system, and all of the database information must be copied from the old memory locations to the new, larger, memory locations where there is room to insert the new information. Even though such a moving of information can take place entirely in memory, it requires significant computing resources. Thus, the database may become temporarily unavailable, which makes such a system inadequate for some applications.

In most prior art systems, the heap management of pages function is usually performed by the operating system for all the applications running on the computer. This approach results in high levels of competition for resources and context switching, which results in a relatively slow and unpredictable response.

Two types of databases are relational databases and network (or interconnected) databases. Relational databases correlate types of information (columns) between different tables in the database. In general, in a relational database, all queries are supported equally, and normalization is a function of the data, not the query. Network databases correlate rows in different tables of the database by pointers, or references to specific rows, and are designed to focus on operational queries. These operational queries reflect a pre-determined decision by the database designer, who selects which columns will contain pointers to other tables. Stated differently, in a relational database, a join occurs at the time of a query, while in a network database, the join happens when data is inserted into the database (because that is when the pointer to other rows are created).

Accordingly, objectives of the present invention include:
 a. To provide a database system that is extremely fast;
 b. To provide a database system in which address resolution is very fast regardless of the number of rows of a particular table;
 c. To provide a database system in which address resolution requires only a fixed number of computer instructions regardless of the number of rows of a particular table;
 d. To provide a database system for which the schema (database dictionary) may be modified without closing the database (i.e., applications can continue to store and retrieve database information while the schema is being modified);
 e. To provide a database system in which the database takes control of all memory allocations within the major memory segment, and the operating system being called only when another large memory segment needs to be assigned or released.

SUMMARY OF THE INVENTION

A database system uses "sets" of pages to store database information from a plurality of tables of information. For a specific type of information (one or more columns of a table) each "set of pages" for that information comprises one or more pages, and each page with a set is capable for storing the same number of rows._As memory for each successive set of pages is allocated, more memory is allocated for storing rows in each page of the set. Similarly, the maximum number of rows of information storable in each page of each set is greater for each successive set of pages.

In one embodiment of the invention, the number of computer instructions needed to resolve (or calculate) the memory address for a particular row is fixed. Unlike balanced binary tree implementations, where the required number of queries to an index increases with the size of the database, with the present invention, given a target row number, (and the number of rows in the first page, and the width of the column or column group), only a fixed number of computer instructions need to be executed to obtain the starting memory address for the target row.

In addition, information of the same type (i.e., one or more columns of a table) may be stored in different pages, and these pages may be located in discontiguous memory segments. As compared to prior systems requiring contiguous memory, this allows space for new rows to be allocated, without requiring all pre-existing rows to be moved to a different memory segment.

In another aspect of the invention, the database system interfaces with software applications that access database information. The system maintains a master copy of each page table. As a part of the interface, the database system maintains a version number for each page table, and provides copies of the page tables to the applications. This allows the applications to calculate physical addresses for information without having to access shared memory, which tends to be slower. This appreciably increases the speed with which information may be retrieved from the database by applications. Moreover, if a change to the database schema (data dictionary) is made, the version number of the master copy is incremented. Before an application attempts to access database information, it checks to see whether the version number of its copy of a page table matches that in the master copy. If they are different, then the application's page table copy is refreshed. This technique allows changes to be made to the database schema while applications access the database information, i.e., the database does not need to be closed.

DETAILED DESCRIPTION

Figure 1:
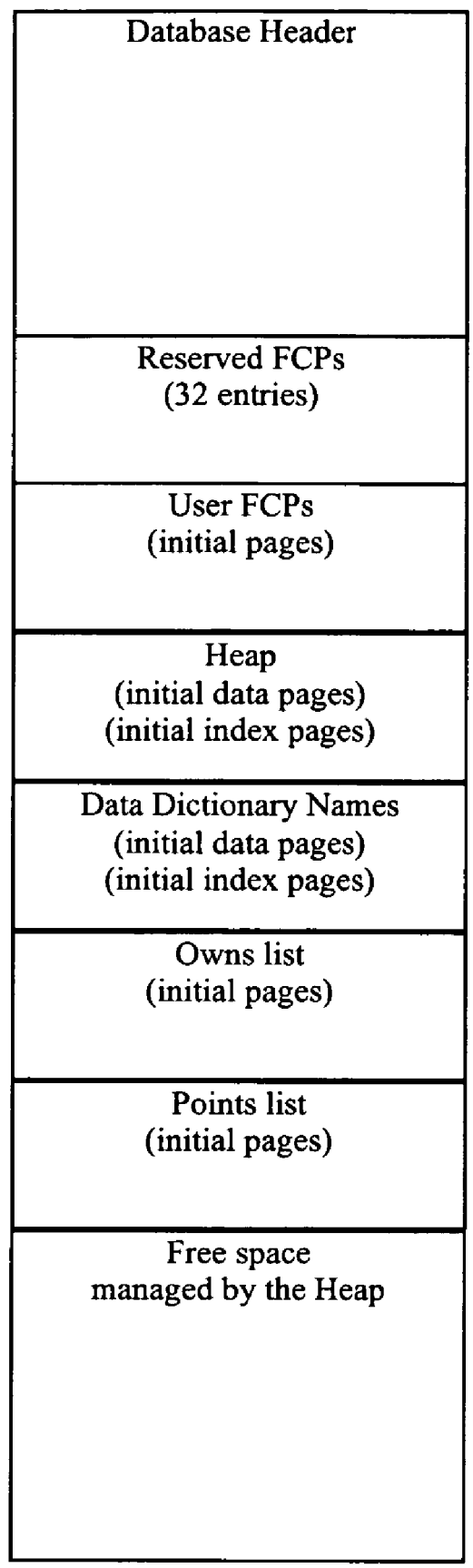
FIG. 1 shows a memory map layout for an exemplary embodiment of the invention.

The invention comprises a database system comprised of multiple tables of information. Each table comprises one or more columns of information. The database is a linked list database. While linked list databases are well-known in the art (see, e.g., U.S. Pat. No. 5,560,006) some of the distinguishing characteristics of them relevant to the present invention are:

a. Each row of a table contains a pointer (such as a row number) to the preceding and next row in the table (or an indicator that the row is and ending (first or last) row in the table).

b. Relationships among rows in different tables (keys) are defined by pointers (such as a row number) to row numbers of another table.

An example of linked list tables is exemplified by the following:

TABLE

PersonInfo (contains names and phone numbers)

| Row No. (Not Stored) | Name | Phone | NextName | Prior Name | Pointer to SSN Row No. |
|---|---|---|---|---|---|
| 1 | Smith | 555-1234 | * | 2 | 3 |
| 2 | Jones | 555-2222 | 1 | 4 | 4 |
| 3 | Brown | 555-8888 | 4 | * | 1 |
| 4 | Johnson | 555-0000 | 2 | 3 | 2 |

TABLE

SSN Info (contains SSNs and No. of Exemptions)

| Row No. (Not Stored) | SSN | No. Exemptions | Next SSN | Prior SSN | Pointer to Name Row No. |
|---|---|---|---|---|---|
| 1 | 222-33-4444 | 3 | 2 | 3 | 3 |
| 2 | 444-33-2222 | 4 | 4 | 1 | 4 |
| 3 | 111-22-3333 | 1 | 1 | * | 1 |
| 4 | 555-44-3333 | 4 | * | 2 | 2 |

The database system may use "sets" of pages to store database information from a plurality of tables of information. For a specific type of information (one or more columns of a table) each "set of pages" for that information comprises one or more pages, and each page with a set is capable for storing the same number of rows. For example, in one embodiment, there are 8 pages in the first "set" of pages, and four pages in each successive set of information. Suppose the first page of data is sized so to hold 100 rows of information.

Each of the next 7 pages would also hold 100 rows, for a total capacity of 800 rows in the 8 pages comprising the first page set. The number of rows held by the $9^{th}$ through $12^{th}$ pages may be doubled to 200 rows, so 1,600 rows may be stored in total. For the third set of pages (13-16), each page may hold 400 rows. The progression is shown by the following table:

| Set No. | No. Pages in Set | No. Rows in Each Page of Set | Total No. of Rows in Set | Cumulative No. of Rows in All Sets |
|---|---|---|---|---|
| 1 | 8 | 100 | 800 | 800 |
| 2 | 4 | 200 | 800 | 1600 |
| 3 | 4 | 400 | 1600 | 3200 |
| 4 | 4 | 800 | 3200 | 6400 |
| 5 | 4 | 1600 | 6400 | 12800 |

The progression may continue. As memory for each successive set of pages is allocated, more memory is allocated for storing rows in each page of the set. Similarly, the maximum number of rows of information storable in each page of each set is greater for each successive set of pages. In the example shown above, the number of pages in the first set is 8. It will be appreciated that memory need only be allocated for one page at a time; memory for all pages in a set need not be allocated when memory for the first page of a new set of pages is allocated. In addition, allocation of memory for a page does not necessarily mean that all of the available memory in the page is populated with data. For example, in the example above, when memory for the first page of the first set is allocated, even if there are only, say 52 rows of database information, the system will still allocate enough space for 100 rows. The remaining 48 rows will be populated as new rows are added to the database. Allocating memory for the $101^{st}$ row may be deferred until the $101^{st}$ row of data is actually requested by the particular application adding data to the database.

In one embodiment, pages contain a power of 2 of the number of entries (entries per page—epp). The base epp (bepp) is the initial epp for pages 0 . . . 7. pages 8 . . . 11 have 2*bepp._pages 12 . . . 15 have 4*bepp and so forth. For a beginning number or rows in the first page of 512, the progression of increasing page size may be as follows

| page number | rows per page | total no. rows |
|---|---|---|
| 0 . . . 7 | 512 | 4K |
| 8 . . . 11 | 1K | 8K |
| 12 . . . 15 | 2K | 16K |
| 16 . . . 19 | 4K | 32K |
| 20 . . . 23 | 8K | 64K |
| 24 . . . 27 | 16K | 128K |
| 28 . . . 31 | 32K | 256K |
| 32 . . . 35 | 64K | 512K |
| 36 . . . 39 | 128K | 1M |
| 40 . . . 43 | 256K | 2M |
| 44 . . . 47 | 512K | 4M |
| 48 . . . 51 | 1M | 8M |
| 52 . . . 55 | 2M | 16M |
| 56 . . . 59 | 4M | 32M |
| 60 . . . 63 | 8M | 64M |
| 64 . . . 67 | 16M | 128M |
| 68 . . . 71 | 32M | 256M |
| 72 . . . 75 | 64M | 512M |
| 76 . . . 79 | 128M | 1G |
| 80 . . . 83 | 256M | 2G |

Efficient calculation techniques may be realized by having 8 pages in the first set of pages, though this is not a requirement of the invention. (However, the number of pages in the first set of pages is preferably a power of two, i.e., 2, 4, 8, 16, 32, 64, etc.). Also, while the number of rows in each page of each set preferably doubles for each successive set of pages, and this allows some efficient calculation techniques to be utilized, it is not mandatory that the increase be by two. Aspects of the invention merely require that there be a continuous increase in the number of rows that may be stored in the each page of successive sets of pages.

Page Tables. In one embodiment, a contiguous memory space is allocated to at least each page. Because tables or columns may be stored in multiple, discontiguous pages, not all data elements of the same data type (columns) are likely to be contiguous in memory. Although logically, multiple columns of a single table are often thought of as being "contiguous," the invention does not require that all data elements of a row be stored in contiguous memory. For example, for the four records in the Personinfo table could be stored with all of the information for Name field being stored first, then all the information for the phone number field, as follows (assuming 10 bytes are allocated for name, 8 for phone, and one byte for each of the next, previous, and pointer fields (yielding a row width of 21 bytes):

```
Smith---555-1234*23Jones---555-2222144Brown---555-
88884*1Johnson-555-0000232----------------------------------
-------------------------------------------------
```

In the above example, the final string of 84 "-"'s represents memory allocated for the first page capable of holding 8 rows, wherein the final 4 rows that are not yet populated with data. Of course, those of skill in the art will further appreciate that this illustrative example assumes that since only one byte is allocated for the next, prior and pointer fields, that the maximum number of rows for the record will be 2^8 or 64. In actual implementations, many more bytes would likely be allocated for these numbers, yielding a larger row width.

Page tables may be used to keep track of the pages. A page table includes an array identifying page numbers, and for each page number, an identification of the memory address (either an offset form a memory segment or a physical memory address) containing the beginning of the data for the column/table page.

In one embodiment, a separate page is created for each column (or sets of columns) of a table that will contain pointers to other tables. The decision of what columns will be combined is usually based on whether the column will serve as an index or key. For example, suppose a table will contain information regarding names, addresses and phone numbers, and the address field will be comprised of street address, city, state and zipcode. If the database designer wishes to have an index only on name, phone number and zip code, then initially, three pages may be created: one for name, street address, city and state, one for phone number, and one for zipcode. In essence, although there are six logical "columns" of information, for purposes of implementation, there will be only three columns, as 4 columns will be grouped together for storage purposes (one of which will be indexed).

One benefit of the present system is that the number of computer instructions needed to calculate the memory address for a particular target row is fixed. The request to retrieve database information can be distilled to: For a given database table (or column), what is the beginning memory address (offset from the beginning of the page) where row x is located (firstbyte in the instructions below)? Answering this question is known as "address resolution." The "memory address" referred to in this embodiment is to the offset from the beginning of the page of memory in which the row resides. To answer this question, several database parameters will be known:

a. The target row number. This is row.
   b. The number of rows in the first page of memory allocated for data elements in the table (or column). This number (or in one embodiment, a variant or indicator of this number, namely the base shift of the number (the log base 2 of the number of rows in the first page of memory allocated for the table or column)) will be stored in the database dictionary. This is bsh (for base shift).
   c. The width the data element (column, or set of columns) This will be stored in the database dictionary. This is width.
   d. The address in memory for the first byte in memory for the data of the page in which the target row is calculated. This is pagestart. This will be stored in the page table.

bsh and width may be stored in the header file for the particular table/column(s).

Specifically, given a target row number (row, in this example, a 64 bit integer), the first byte of memory of the row containing the target row may be calculated as follows.

```
sh = bsrl( row | (1 << (bsh+2)) ) – 2 ; // calculate the shift for a given row
    using the barrel shift right logical command
mask = (1 << sh) – 1 ;      // calculate a mask to be used for page row
(prow) calculation
pg = (row >> sh) + ((sh – bsh) << 2) ; // Calculate the page # (0 based
    (the first page is page no. 0)
prow = row & mask ;         // calculate the row on the page # from above
poff = prow * width ;       // calculate the byte offset for the row on the
page
firstbyte = pagestart +poff //calculate the firstbyte of the target row
```

Thus, the number of computer instructions needed to show the calculations that must be performed to calculate the memory address can be represented by the above six statements. Those of skill in the art will appreciate that these equations will work regardless of the number rows in the database. The only limit on the size of the database will be the number of bits used to store an integer.

Of course, larger or smaller databases may be accommodated by selecting CPU architectures other than 64 bit architecture.

Once the page and offset from a row have been calculate, the remaining calculations are as follows:

```
2. Get page size in KBytes
    Given epp and width
    pgsz = ((epp * width) + HEAPUNIT – 1) >> HEAPSHIFT ;
    // MKMOD(epp*width,HEAPUNIT) >> HEAPSHIFT
3. Get epp (and pgsz) given page
    Given bsh
    if ((pg & 7) == 0) sh = bsh ;
    else sh = bsh + ((pg – 4) >> 2) ;
    as before: epp = (U64)1 << sh ;
      pgsz = MKMOD(epp*width,HEAPUNIT) ;
4. Get initial bsh, bepp and bpgsz given width and depth
    if (depth = 0) // Try for depth ~ 8K/width
      bsh = bsrl(8192/width) ; // ok if it is 0
    else
      bsh = bsrl(depth >> 3) ;
    bepp = 1 << bsh ;
    bpgsz = MKMOD(bepp*width,HEAPUNIT) >> HEAPSHIFT ;
```

-continued

```
5. Get total N given pages and bsh
   if ((pages >> 3) == 0) totN = pages << bsh ;
   else {
     sh = bsh + ((pages – 5) >> 2) ;
     totN = ((((pages–1)&3)+1) << sh) + (1 << (sh+2)) ;
   }
   Note: last page = pages – 1
         database depth = totN – 1, row: [0..totN–1]
```

Once poff (Page Offset) is known, this number may be simply added to a number representing the beginning address of the page in which the row is located, to yield the physical memory address of the first byte of the row. The latter information may be stored in a page table, or a combination of a page table and a memory segment table (if the system is implemented on a computer in which multiple memory segments may be allocated to the database system). In summary, the physical memory address for the first byte or a row equals the sum of: (a) the beginning address of the memory segment in which the page is stored; (b) the beginning address (measured from the beginning of the memory segment) of the beginning of the data for the page; and (c) the page offset. For example, in one embodiment, the database system can request from the operating system multiple memory segments as the need arises, and each memory segment may store one or more pages. For example, the following table shows how three exemplary memory segments might be allocated. Typically, the database system will request additional memory to be allocated (usually by the operating system) whenever space for additional rows must be allocated that exceeds the amount of space available in the existing memory segment(s).

| Memory Segment Table |||
|---|---|---|
| Memory Segment Name | Size | Physical Memory Starting Address |
| Segment_1 | 250,000,000 | 50,000,000 |
| Segment_2 | 500,000,000 | 475,000,000 |
| Segment_3 | 1,000,000,000 | 2,300,000,000 |

Similarly, one or more pages may be stored in each memory segment.

| Page Table |||||
|---|---|---|---|---|
| Page Name | Size of Page | Name of Memory Segment Page is Stored In | Physical Memory Starting Address of segment | Offset from Beginning of Segment to Page | Physical Memory Address of first byte of column/page |
| Column_1_Page_1 | 50,000 | Segment_1 | 50,000,000 | 0 | 50,000,000 |
| Column_2_Page_2 | 75,000 | Segment_1 | 50,000,000 | 50,001 | 50,050,001 |
| Column_1_Page_3 | 150,000 | Segment_1 | 50,000,000 | 125,000 | 50,125,001 |
| ... |
| Column_1_Page_4000 | 500,000 | Segment_3 | 2,300,000,000 | 1,000 | 2,300,001,000 |
| Column_2_Page_4001 | 750,000 | Segment_3 | 2,300,000,000 | 501,000 | 2,30,501,000 |
| Column_3_Page_4002 | 600,000 | Segment_3 | 2,300,000,000 | 12,501,000 | 2,312,501,000 |

For purposes of illustration, the above page table contains more information than is actually necessary, The only information that needs to be specified in a page number table is, for each page, an offset into memory for the beginning memory address of the page. It is a matter of choice as to whether this offset refers to an absolute physical memory address, or to the offset from the beginning of the particular memory segment in which the page is stored. If the latter, then each time a beginning page address is retrieved from the page table, the beginning physical address of the memory segment must be added to it to yield the beginning physical memory address for the page. As noted above there can thereafter be added to this number the product of the target row number and width of the table/column to yield the physical first bye address of the target row.

Those of skill in the art will further appreciate that the page tables are transient. Specifically, the page tables may be re-created when a database is opened.

In addition, information of the same type (i.e., one or more columns of a table) may be stored in multiple pages, and these pages may be located in discontiguous memory segments. As compared to prior systems requiring contiguous memory, this allows space for new rows to be allocated, without requiring all pre-existing rows to be moved to a different memory segment.

Thus, in the example shown above, to calculate the physical memory address for a particular row of a given column which begins with the $399^{th}$ byte of the page Column_2_Page_4001, one would sum 2,300,000,000 (beginning address of the Segment_3), 12,501,000, and 399 to yield 2,312,501,399.

Those of skill in the art will appreciate that memory segment tables and pages will typically include some header information, so the first byte of data will not necessarily be the first byte of the memory allocated for the page. However, the size of the header can either be a predetermined amount, or be stored in a predetermined byte offset from the first byte of the page file.

One design consideration involves the number of rows that should be allocated for on the first page. One method for doing this is to default to some number, say 512. Another method is to allow the application requesting the creating of a table (or column) to specify an estimated maximum number of rows the database will hold, and divide this number by four, and round up to next highest power of two. For example, if a table with 400,000 rows is estimated, the initial page may have 65,536 rows. Seven pages would yield 458,752 rows for the estimated 400,000-row requirement.

Those of skill in the art of network databases will appreciate that several characteristics of a network database well-known in the art are inherent. For example, when a row of data is deleted, prior and subsequent rows are not ordinarily shifted to occupy the same physical memory space of the deleted data. Instead, the availability of the memory space formerly occupied by the deleted data is noted by either a reference in the header of the page or, for example, by inserting null values in the space. Moreover, when data is inserted into a row, its pointers to related rows of other tables are updated at the time consistent with the database schema.

In another aspect of the invention, the database system interfaces with software application(s) that access database information. The system maintains a master copy of each page table. As a part of the interface, the database system maintains a version number for each page table, and provides copies of the page tables to the applications. This allows the applications to calculate physical addresses for information without having to access shared memory, which can be slower. This increases the speed with which information may be retrieved from the database. Moreover, if a change to the database schema (data dictionary) is made, the version number of the master copy is incremented. Before an application attempts to access database information, it checks to see whether the version number of its copy of a page table matches that in the master copy. If they are different, then the application's page table copy is refreshed. This technique allows changes to be made to the database schema while applications access the database information, i.e., the database does not need to be closed.

The database system of the present invention maintains a data dictionary maintains a version number that increments each time a change is made to the schema (data dictionary). However, those of skill in the art will appreciate that changes to application data—inserts, updates, deletes—do not change the data dictionary. The primary access routines (the API) may resolve certain data structure addresses and keep them in local application data space. The next time a resource must be accessed, the application checks the data dictionary version number to see if it has changed. If this version number has not changed, then the local copies of the data structure addresses may be used. If this version number has changed, then the local copies of these addresses must be re-calculated. Address caching recovers the performance lost due to page-table lookups. In one embodiment, all of this activity is managed totally transparently to the applications using the database.

In one embodiment, the invention also includes a backup facility that continuously copies database modifications into persistent (disk) storage or to remote memory structures. This facility is accomplished using a multi-layered copy facility that protects against any single point of failure and is transparent and non-intrusive to the applications using the invention. In one embodiment, the database will be "out-of-service" for less than 1 millisecond when the backup occurs regardless of the size of the total database.

In one embodiment, the backup event can be triggered in one of three ways.

1. Any of the applications using the database may request a backup at any time. The database administrator may make interactive backup requests.
2. Pages that are modified are marked "dirty" (changed) and the total size of the dirty pages since the last backup is maintained. If a pre-defined limit is reached, a backup event occurs.
3. A timer is set to force regular interval backup events even if no database modifications have occurred since the last backup event.

System Services: In one embodiment, a collection of database services is incorporated into the invention such as the following:

Startup: Build a new database.
Modify: Add new rows and columns to existing tables. Drop rows, columns, or entire tables that are no longer needed.
Backup: Perform one-time or continuous backup of the database. Applications may continue to modify the database during the backup process.
Replicate: An "in-memory" replica of the database may be initiated at any time. The replica may be local or remote. Continuous updates to the replica (or replicas) are performed similar to the way that continuous backups are performed. Applications may continue to modify the database during the replication process.
Restart/Recovery: Modifications to the database that occur between backup events are written to a sequential journal file. This file may be used to recover the system in the event of a catastrophic failure. The last good backup is recalled into main storage and then transactions from the journal file are spooled back into the database.
Monitor: A monitor program keeps track of critical database properties. If a problem is anticipated, a notification may be sent so that corrective action may be taken.
Shutdown: A facility will be provided to perform an orderly shutdown of the system.
SQL: SQL procedures may be pre-processed in the database server.
Fix: A collection of troubleshooting procedures and corrective action utilities are included. For example, the index on a key may be rebuilt online if it is found to be damaged, with no disruption to the use of the database.
File Load: A utility to incrementally load data from files into database tables is provided.
Batch Load: A utility that performs the initial load of data into a table is provided. This utility uses batch sort techniques (quicksort) to add additional performance (10×) at startup.

In one embodiment, the server uses the TCP/IP networking protocol to manage remote requests. A single "listen" socket is used for all requests. When a connection is made to the server, a new execution thread is created (multi-threading) to service the request. New services may be added at any time (online) using shared library dynamic linking. Multi-threading is used to take advantage of modem multiprocessor computers where separate threads actually execute simultaneously.

Lock Granularity: Another feature of the database system is a lock management facility based on spinlock technology. Spinlocks represent the highest performance mechanism used to control access to shared resources. The database system provides a multi-dimensional locking feature called lock domains. Access to database resources from multiple applications involves special considerations to avoid common pitfalls associated with shared structures. As used herein, "database resources" means data stored in the database. These problems include:

Two applications needing access to totally separate data structures should not block each other.
Two applications needing access to the same set of resources must be queued (one blocks the other) but must not be allowed to deadlock (each blocks the other).
Two applications needing "read" access to the same set of resources should not block.

To update a table, an application needs to have "read" access to the data dictionary and "write" access to the columns of the table to be updated. Multiple read-locks are allowed on a single resource but a write-lock must block all other readers and writers. For example, suppose App1 needs to update Table1 and App2 needs to update Table2. No blocking action is needed. They may both read-lock the data dictionary and write-lock the separate columns to be updated.

Now suppose App1 wishes to read from Table2—Col1 and Col2. App2 wishes to update (write) Table2—Col3 based on what it finds (reads) in Col2. Even though both applications are accessing Table2, the write-lock on Col3 from App2 does not conflict with the any of the read-locks form App1. Here again, these two applications will not block.

Spinlocks are used to manage these lock domains for performance reasons. When a blocking action is needed, the operating system services are required to suspend one of the applications (threads). This facility is relatively slow compared to the database's performance parameters. For this reason, these services should be avoided unless it is absolutely necessary. A spinlock is used to mark a resource as locked. If the lock is released before any other thread tries to access the resource, the block is avoided and no operating system services are needed.

Double Linked Lists: One embodiment of the database includes software to manage one to many relationships using double-linked list structures. Inserts and deletes are supported at any point in the list. Linked list traversal is fast. This technology is an effective tool for managing non-contiguous data. The concept of double linked lists in the invention has been extended to incorporate the ability to dynamically modify the database logical structure definition that is embodied in the linked lists. Linked lists are the preferred method of addressing data when the information structure is time base or sequentially related. This is the fastest way to traverse a data set of this type.

Balanced Binary Trees: One embodiment of the database may implement sorted "Keys" using a balanced binary tree indexing scheme. The index tree is re-balanced with every insert or delete. Lookups use this index to provide guaranteed worst case times proportional to LOG(N) (where N represents the number of rows in the table). This results in a very gradual decline in performance with size. The approach to balanced binary tree indexing used in the system may follow the red/black model of Sedgwick ("Algorithms in C++", Sedgwick). The algorithms described by Sedgwick may be adapted to permit dynamic modification of a database logical structure definition. Binary tree structures are the preferred approach when the lookup function is a random search in large database.

It will be appreciate by those of skill in the art that various terms, such as a database "storage area" or a database "resource," as used in the, claims refers to a logical data structure or software, respectively, as may be defined, for example, by software used to implement the invention. While such software could be executing on a computer, it is the intent that the claims also embody software that has not yet been installed on a computer. For example, the storage "area" and "memory pages" can all be defined in software.

Source code for implementing aspects of the invention is shown in the Appendix 1. This includes the structure for the header of the shared memory segment table. The first entry in the database (shared memory segment 0) is the "Magic" number. This is an arbitrary binary value used to identify a valid database. The current value is 3500094376. The "Version" number starts at 1 (one) and is incremented whenever a change is made to the database header. This would include adding a new memory segment to the database of adding new pages to the Heap. The "ShmMax" value is taken from the license file and defines the maximum number of shared memory segments. This number never exceeds 256. The "Shminuse" value identifies the current number of shared memory segments. The "SessionMax" value is taken from the license file and defines the maximum number of database connections allowed. This might be −1 (minus one) which indicates an unlimited number of connections. The "SessionInuse" value identifies the current number of connected sessions. The "Locale" string defines the current native language locale. This value is used to establish international character sort order. The "HeapPgThlInuse" defines the number of entries in the Heap data page table. The "HeapPgThlShift" defines the Heap data page table initial shift property. The initial number of entries per page (Heap page 0) is defined as 2 raised to the HeapPgThlShift power. The default value is 8. The initial default entries per page is 256. The "HeapPgThl" consists of 64 page table entries for the Heap data pages. This represents a maximum of 32 million heap entries. Each heap entry represents a minimum of 1 kilobyte and a maximum of 2 terabytes. The "ResFCP" defines the start location (byte offset from the beginning of segment 0) of the reserved FCPs.

Appendix 1 also shows header information for the page tables (or Field Control Properties/FCP). The user defined FCP entries follow the reserved FCP entries. Each user defined data type represents a database field (column or a database link). User defined fields are assigned integer unit numbers starting with one and growing as needed to the maximum allowed fields of 2^31 (two raised to the 31 power) ~2 billion. Reserved FCP entries are assigned negative unit numbers starting with −1. Unit number 0 is associated with the Key field that holds the database table and column names. This Key is searched to associate table and column names with field unit numbers.

The four address resolver entries (in the ResAdd structure) provide the necessary structure to convert a row number into a physical address.

A representative API for allowing a database system of the present invention to interface with applications is shown in Appendix 2.

We claim:

1. A system for resolving addresses of information stored in a network database, wherein the network database is comprised of a plurality of tables of information, each table containing rows of a data element and pointers to previous and successor rows, the system comprising:
   a central processing unit and solid state memory accessible by the central processing unit;
   a plurality of sets of one or more pages stored in the solid state memory, each set comprising:
   one or more pages,
   each of said one or more pages having a maximum page size and being capable of storing the same number of rows;
   for each page, means for specifying the location of the page in solid state memory;
   means for resolving the address of a target row of a table, wherein the target row is stored in page of one of the plurality of data sets, the means for resolving including:
   an indicator of a maximum number of rows allocated in the first page of memory, and
   software implementing a methodology by which the maximum page size of each of the one or more pages of each successive set of one or more pages increase in size;
   wherein the maximum page size of each page of each set of one or more pages is greater for each successive set of one or more pages.

2. The system of claim 1 wherein the maximum number of rows storable in each page of each successive set of pages is twice the number of the maximum number of rows storable in each page of the preceding set of pages.

3. The system of claim 1 wherein the maximum number of rows storable in each page is a power of two.

4. The system of claim 1 wherein the maximum page size of each successive page in a set of pages is double the maximum page size of each page in the preceding set of pages.

5. The system of claim 1 further comprising electronic memory in which the network database is stored.

6. The system of claim 1 wherein all pages for a specific table of information are not in a contiguous memory space.

7. A system for resolving addresses of a row of information stored in a network database, wherein the network database is comprised of a plurality of tables of information, each table containing rows of a data element and pointers to previous and successor rows in the table, the system comprising:
- a central processing unit and solid state memory accessible by the central processing unit;
- a plurality of pages
  - each page storing rows of data elements and having a maximum page size and;
  - at least one of the pages being in memory space discontiguous from the other pages storing the same type of data elements;
- a page table comprising:
  - a plurality of page numbers and
  - a memory address for the beginning memory location of the page associated with each page number;
  - an indicator of a maximum number of rows allocated in the first page of solid state memory, and
  - an indicator of the width of each row in the table;
- means for receiving a target row number;
- software for calculating the beginning memory location of the page containing the target row of information from the following inputs:
  - the page table;
  - the target row number,
  - the indicator of the maximum number of rows allocated in the first page, and
  - the indicator of the width of each row in the table;
- wherein the means for calculating includes the execution of a fixed number of computer instructions regardless of the values of the inputs.

8. The system of claim 7 wherein:
the plurality of pages are comprised of multiple page sets; and
the maximum number of rows of information storable in each page of each set is greater for each successive set of pages.

9. The system of claim 7 further comprising:
a plurality of tables of information, each table containing rows of information.

10. The system of claim 7 wherein the computer instructions executed during the means for calculating steps are selected from the follow instruction set: AND, OR, shift, ADD, mask and integer multiplication.

* * * * *